(12) United States Patent
Van Bosch et al.

(10) Patent No.: US 7,245,898 B2
(45) Date of Patent: Jul. 17, 2007

(54) PROGRAMMABLE FOOT SWITCH USEABLE IN A COMMUNICATIONS USER INTERFACE IN A VEHICLE

(75) Inventors: James A. Van Bosch, Crystal Lake, IL (US); Michael A. Newell, Williams Bay, WI (US); Robert Faust D'Avello, Lake Zurich, IL (US); Scott B. Davis, Walworth, WI (US); Nick B. Grivas, Harvard, IL (US)

(73) Assignee: Motorola, Inc., Schaumburg, IL (US)

( * ) Notice: Subject to any disclaimer, the term of this patent is extended or adjusted under 35 U.S.C. 154(b) by 219 days.

(21) Appl. No.: 10/818,076

(22) Filed: Apr. 5, 2004

(65) Prior Publication Data

US 2005/0219062 A1    Oct. 6, 2005

(51) Int. Cl.
*H04B 1/06* (2006.01)
(52) U.S. Cl. .................. 455/345; 455/99; 340/825.72
(58) Field of Classification Search ............... 455/344, 455/345; 340/825.72
See application file for complete search history.

(56) References Cited

U.S. PATENT DOCUMENTS

| | | | |
|---|---|---|---|
| 5,126,733 A | 6/1992 | Sagers et al. |
| 5,214,790 A | 5/1993 | Kozlowski et al. |
| 5,235,631 A | 8/1993 | Grube et al. |
| 5,471,646 A | 11/1995 | Schultz |
| 5,511,232 A | 4/1996 | O'Dea et al. |
| 5,530,914 A | 6/1996 | McPheters |
| 5,535,426 A | 7/1996 | Leigh et al. |
| 5,542,108 A | 7/1996 | Sasuta |
| 5,758,291 A | 5/1998 | Grube et al. |
| 5,870,149 A | 2/1999 | Comroe et al. |
| 5,884,196 A | 3/1999 | Lekven et al. |
| 5,912,882 A | 6/1999 | Yafuso et al. |
| 5,960,362 A | 9/1999 | Grob et al. |
| 5,983,099 A | 11/1999 | Yao et al. |
| D424,052 S | 5/2000 | Haile et al. |
| 6,141,347 A | 10/2000 | Shaughnessy et al. |
| 6,275,500 B1 | 8/2001 | Calloway, Jr. et al. |
| 6,360,093 B1 | 3/2002 | Ross et al. |
| 6,366,782 B1 | 4/2002 | Fumarolo et al. |
| 6,373,829 B1 | 4/2002 | Vilmur |

(Continued)

OTHER PUBLICATIONS

Emerging Wireless Technologies, Emerging Wireless Services Assessment, May 2002, 5 pages.

*Primary Examiner*—Temica Beamer
(74) *Attorney, Agent, or Firm*—Thomas V. Miller; Terri S. Hughes

(57) ABSTRACT

A communications system for a vehicle having a foot pedal useable to control communications at a user interface in the vehicle. By controlling the user interface at least in part through activation of the foot pedal, communications in the vehicle are made more convenient and less dangerous as the user need not use his hands to operate the communications user interface. The foot pedal may perform a dedicated communications control function, or may be programmable to perform a communications control function of a user's choosing. Several foot pedals may be used, either in conjunction with a single seat, or each associated with a particular seat in the vehicle. Foot pedal communication settings may also be stored within the communications user interface for easy retrieval, and may be retrievable through entry of a user ID, such as may come from a key fob.

32 Claims, 6 Drawing Sheets

U.S. PATENT DOCUMENTS

| | | |
|---|---|---|
| 6,516,200 B1 | 2/2003 | Schmidt et al. |
| 6,647,270 B1 | 11/2003 | Himmelstein |
| 6,865,403 B1 | 3/2005 | Averkamp |
| 2002/0148668 A1* | 10/2002 | Smythe .................. 180/334 |
| 2003/0065427 A1 | 4/2003 | Funk et al. |
| 2003/0083086 A1 | 5/2003 | Toyryla et al. |
| 2003/0100326 A1 | 5/2003 | Grube et al. |
| 2004/0129487 A1 | 7/2004 | Shabana et al. |

* cited by examiner

PROGRAMMABLE FOOT SWITCH USEABLE IN A COMMUNICATIONS USER INTERFACE IN A VEHICLE

The present application is related to the following co-pending, commonly assigned patent applications, which were filed concurrently herewith and incorporated by reference in their entirety:

Ser. No. 10/818,077, entitled "Selectively Enabling Communications at a User Interface Using a Profile," filed concurrently herewith.

Ser. No. 10/818,109, entitled "Method for Enabling Communications Dependent on User Location, User-Specified Location, or Orientation," filed concurrently herewith.

Ser. No. 10/818,078, entitled "Methods for Sending Messages Based on the Location of Mobile Users in a Communication Network," filed concurrently herewith.

Ser. No. 10/818,000, entitled "Methods for Displaying a Route Traveled by Mobile Users in a Communication Network," concurrently herewith.

Ser. No. 10/818,267, entitled "Conversion of Calls from an Ad Hoc Communication Network," filed concurrently herewith.

Ser. No. 10/818,381, entitled "Method for Entering a Personalized Communication Profile Into a Communication User Interface," filed concurrently herewith.

Ser. No. 10/818,079, entitled "Methods and Systems for Controlling Communications in an Ad Hoc Communication Network," filed concurrently herewith.

Ser. No. 10/818,219, entitled "Methods for Controlling Processing of Inputs to a Vehicle Wireless Communication Interface," filed concurrently herewith.

Ser. No. 10/818,080, entitled "Methods for Controlling Processing of Outputs to a Vehicle Wireless Communication Interface," filed concurrently herewith.

FIELD OF THE INVENTION

This invention relates to a programmable foot switch useable in a communications user interface in a vehicle.

BACKGROUND OF THE INVENTION

Communication systems, and especially wireless communication systems, are becoming more sophisticated, offering consumers improved functionality to communicate with one another. Such increased functionality has been particularly useful in the automotive arena, and vehicles are now being equipped with communication systems with improved audio (voice) wireless communication capabilities. For example, On Star™ is a well-known communication system currently employed in vehicles, and allows vehicle occupants to establish a telephone call with others (such as a service center) by activating a switch with a hand/finger.

As is known, the user interface can contain one or more hand/finger switches to engage various communication features that the user interface provides. For example, such buttons may be used as the push-to-talk button for the communications system, or may be used to select various communication options and features. Such buttons, however, are usually placed in locations within the vehicle where they are easily accessible by a hand of the user. Thus, certain buttons may be placed on the console near the front passengers, or they may be placed on a steering wheel so that the driver will not need to have his hands leave the wheel to engage the communications system. For example, in a prior art Cadillac CTS automobile, the steering wheel contains user interface buttons that are programmable. In this way, a user or driver of the vehicle can program various buttons to achieve various options.

However, such a solution is still not ideal. As vehicle-based communications become more complicated, a user or driver of the vehicle will be provided many different communication options. For example, the interface may contain a push-to-talk button, phone call answer/end, voice recognition activation, speaker mute/unmute, etc., as well as other buttons that may be used to tailor communications, such as are disclosed in the above-referenced related applications, all of which are filed concurrently herewith incorporated by reference herein their entireties. In short, as vehicle communications become more powerful, a user will be required to keep track of and press more and more buttons on their user interfaces. This disclosure presents a solution to this problem.

Figure 1:
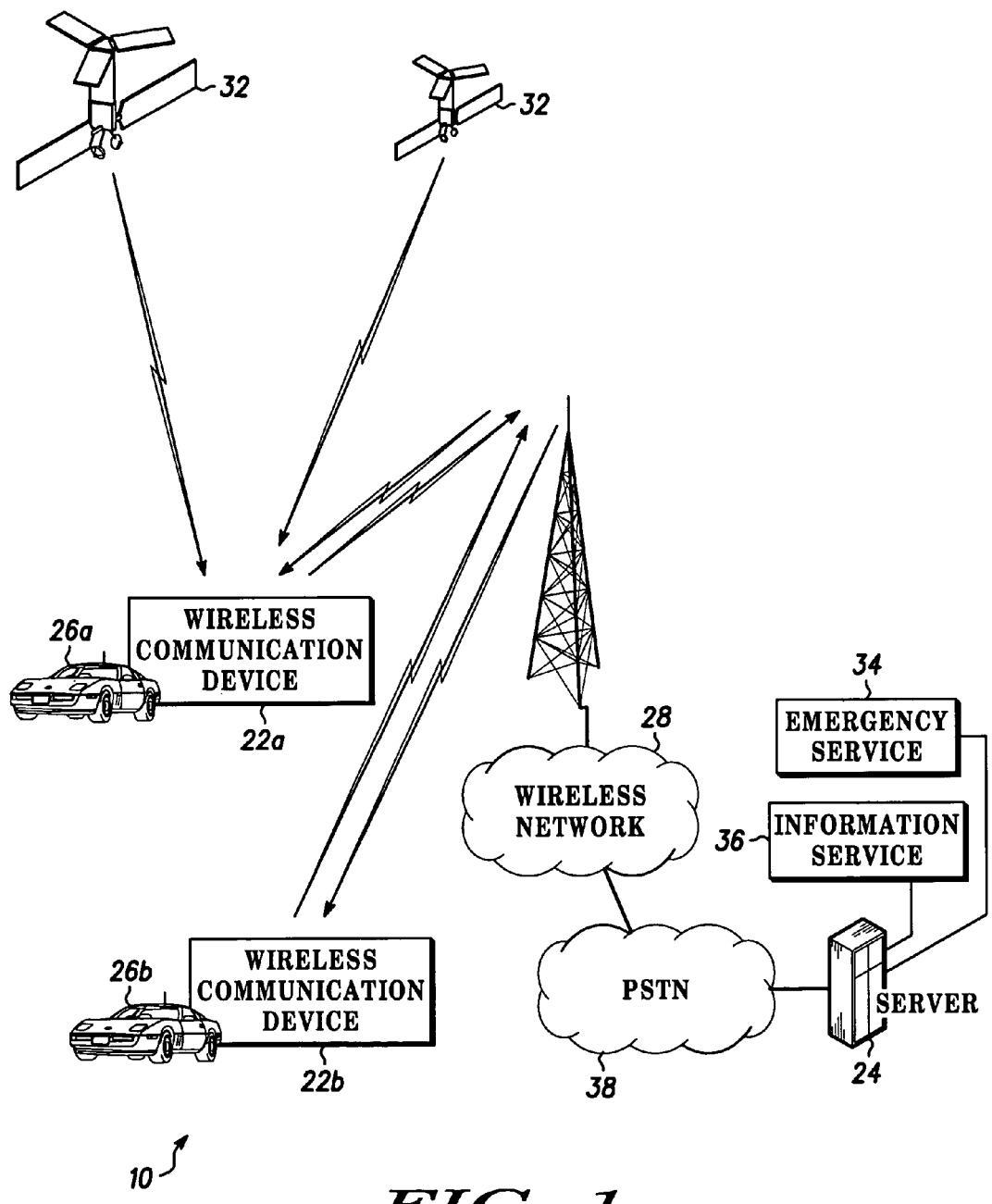
FIG. 1 is a block diagram of a wireless vehicular communications system.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DETAILED DESCRIPTION

What is described is a communications system for a vehicle having a foot pedal or switch useable to control communications at a user interface in the vehicle. By controlling the user interface at least in part through activation of the foot pedal or switch, communications in the vehicle are made more convenient as the user need not use his hands to operate the communications user interface. The foot pedal or switch may perform a dedicated communications control function, or may be programmable to perform a communications control function of a user's choosing. Several foot pedals may be used, either in conjunction with a single seat, or each associated with a particular seat in the vehicle. Foot pedal communication settings may also be stored within the communications user interface for easy retrieval, and may be retrievable through entry of a user ID, such as may come from a key fob.

Now, turning to the drawings, an example use of the present invention in an automotive setting will be explained. FIG. 1 shows an exemplary vehicle-based communication system 10. In this system, vehicles 26 are equipped with wireless communication devices 22, which will be described in further detail below. The communication device 22 is capable of sending and receiving voice (i.e., speech), data (such as textual or SMS data), and/or video. Thus, device 22 can wirelessly transmit or receive any of these types of information to a transceiver or base station coupled to a wireless network 28. Moreover, the wireless communication device may receive information from satellite communications. Ultimately, either network may be coupled to a public switched telephone network (PSTN) 38, the Internet, or other communication network on route to a server 24, which ultimately acts as the host for communications on the communication system 10 and may comprise a communications server. As well as administering communications between vehicles 26 wirelessly connected to the system, the server 24 can be part of a service center that provides other services to the vehicles 26, such as emergency services 34 or other information services 36 (such as restaurant services, directory assistance, etc.).

Figure 2:
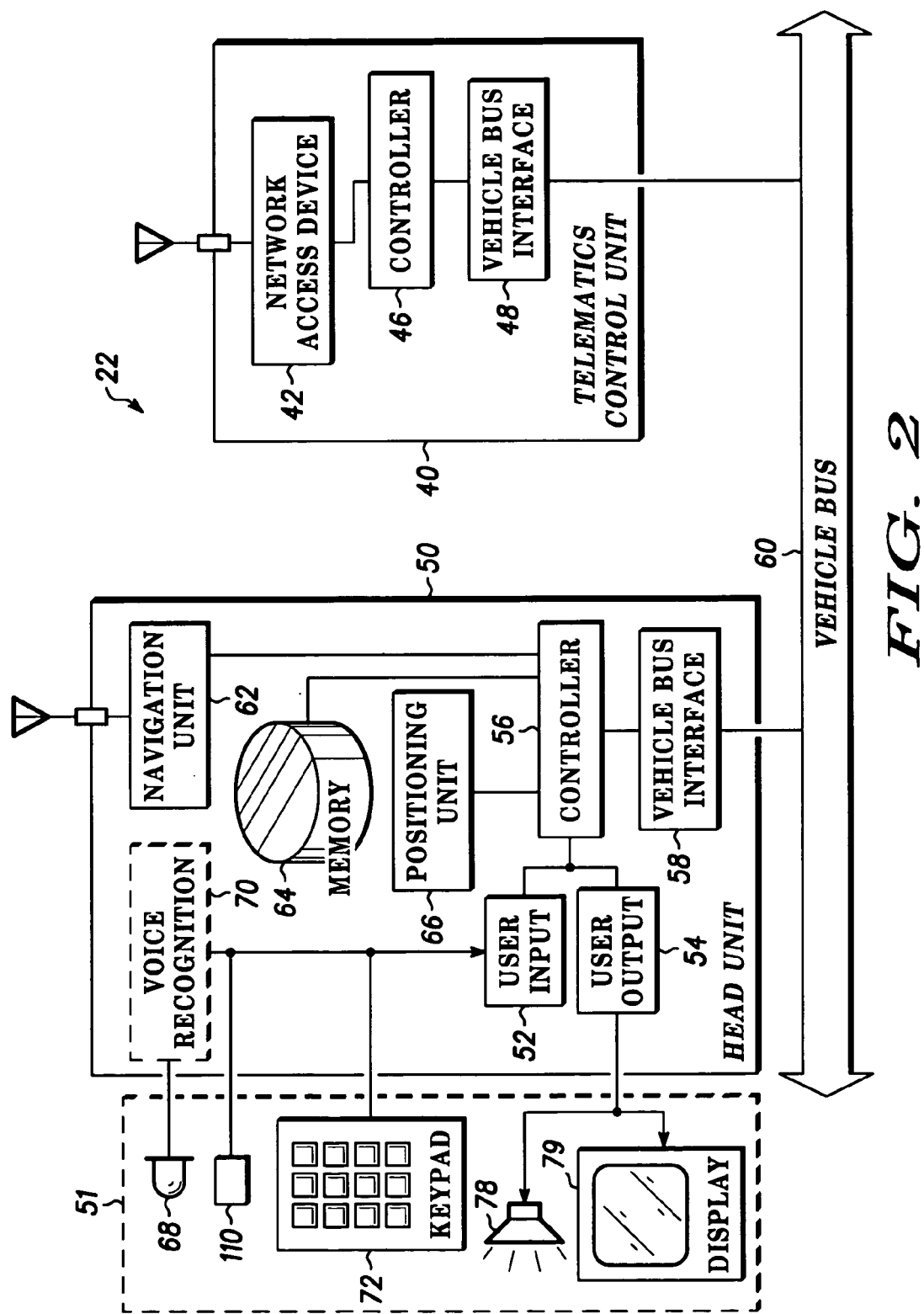
FIG. 2 is a block diagram of a control system for a vehicular wireless communications system.

Further details of a typical wireless communications device 22 as employed in a vehicle 26 are shown in FIG. 2. In one embodiment, the device 22 is comprised of two main components: a head unit 50 and a Telematics control unit 40. The head unit 50 interfaces with or includes a user interface 51 with which the vehicle occupants interact when communicating with the system 10 or other vehicles coupled to the system. For example, a microphone 68 can be used to pick up a speaker's voice in the vehicle, and/or possibly to give commands to the head unit 50 if it is equipped with a voice recognition module 70. A keypad 72 may also be used to provide user input, with switches on the keypad 72 either being dedicated to particular functions (such as a push-to-talk switch, a switch to receive mapping information, etc.) or allowing for selection of options that the user interface provides. Additionally, the user input may also include one or more foot pedals 110, as will be explained in more detail below.

The head unit 50 also comprises a navigation unit 62, which typically includes a Global Positioning Satellite (GPS) system for allowing the vehicle's location to be pinpointed, which is useful, for example, in associating the vehicle's location with mapping information the system provides. As is known, such a navigation unit communicates with GPS satellites (such as satellites 32) via a receiver. Also present is a positioning unit 66, which determines the direction in which the vehicle is pointing (north, north-east, etc.), and which is also useful for mapping a vehicle's progress along a route.

Ultimately, user and system inputs are processed by a controller 56 which executes processes in the head unit 50 accordingly, and provides outputs 54 to the occupants in the vehicle, such as through a speaker 78 or a display 79 coupled to the head unit 50. The speakers 78 employed can be the audio (radio) speakers normally present in the vehicle, of which there are typically four or more, although only one is shown for convenience. Moreover, in an alternative embodiment, the output 54 may include a text to speech converter to provide the option to hear an audible output of any text that is contained in a group communication channel that the user may be monitoring. This audio feature may be particular advantageous in the mobile environment where the user is operating a vehicle. Additionally, a memory 64 is coupled to the controller 56 to assist it in performing regulation of the inputs and outputs to the system. The controller 56 also communicates via a vehicle bus interface 58 to a vehicle bus 60, which carries communication information and other vehicle operational data throughout the vehicle.

The Telematics control unit 40 is similarly coupled to the vehicle bus 60, via a vehicle bus interface 48, and hence the head unit 50. The Telematics control unit 40 is essentially responsible for sending and receiving voice or data communications to and from the vehicle, i.e., wirelessly to and from the rest of the communications system 10. As such, it comprises a Telematics controller 46 to organize such communications, and a network access device (NAD) 42 which include a wireless transceiver. Although shown as separate components, one skilled in the art will recognize that aspects of the head unit 50 and the Telematics control unit 40, and components thereof, can be combined or swapped.

The wireless communications device 22 can provide a great deal of communicative flexibility within vehicle 26. For example, in this embodiment, an occupant in a first vehicle 26a can call a second vehicle 26b to speak to its occupants either by pressing the foot pedal (or switch) 110. In one embodiment, the pressing of the foot pedal 110 initiates a cellular telephone call with a second vehicle 26b. In this case, users in either the first vehicle 26a or the second vehicle 26b can speak with each other without pressing any further switches. In an alternative embodiment, the foot pedal 110 may be configured to establish a push-to-talk communication channel over a cellular network. Here, the controller 56 is configured to only allow audio by occupants in the first vehicle 26a through microphone 68 to be transmitted through the Telematics control unit 40 when a user in the first vehicle 26a is pressing down on the foot pedal 110. The controller 56 is further configured to only allow audio received from the second vehicle 26b (or server 24) to be heard over speakers 78 when the operator of the first vehicle 26a is not pressing down on the foot pedal 110. Alternatively, to avoid having a user to hold down the pedal to speak, the user may push the pedal a first time to transmit audio and push the pedal a second time to receive audio.

In any event, a user in the second vehicle 26b can, in like fashion, communicate back to the first vehicle 26a, with the speaker's voice being heard on speaker(s) 78 in the first vehicle. Or, an occupant in the first vehicle 26a can call the server 24 to receive services by programming the foot pedal 110 to communicate with a service center directly.

Figure 3:
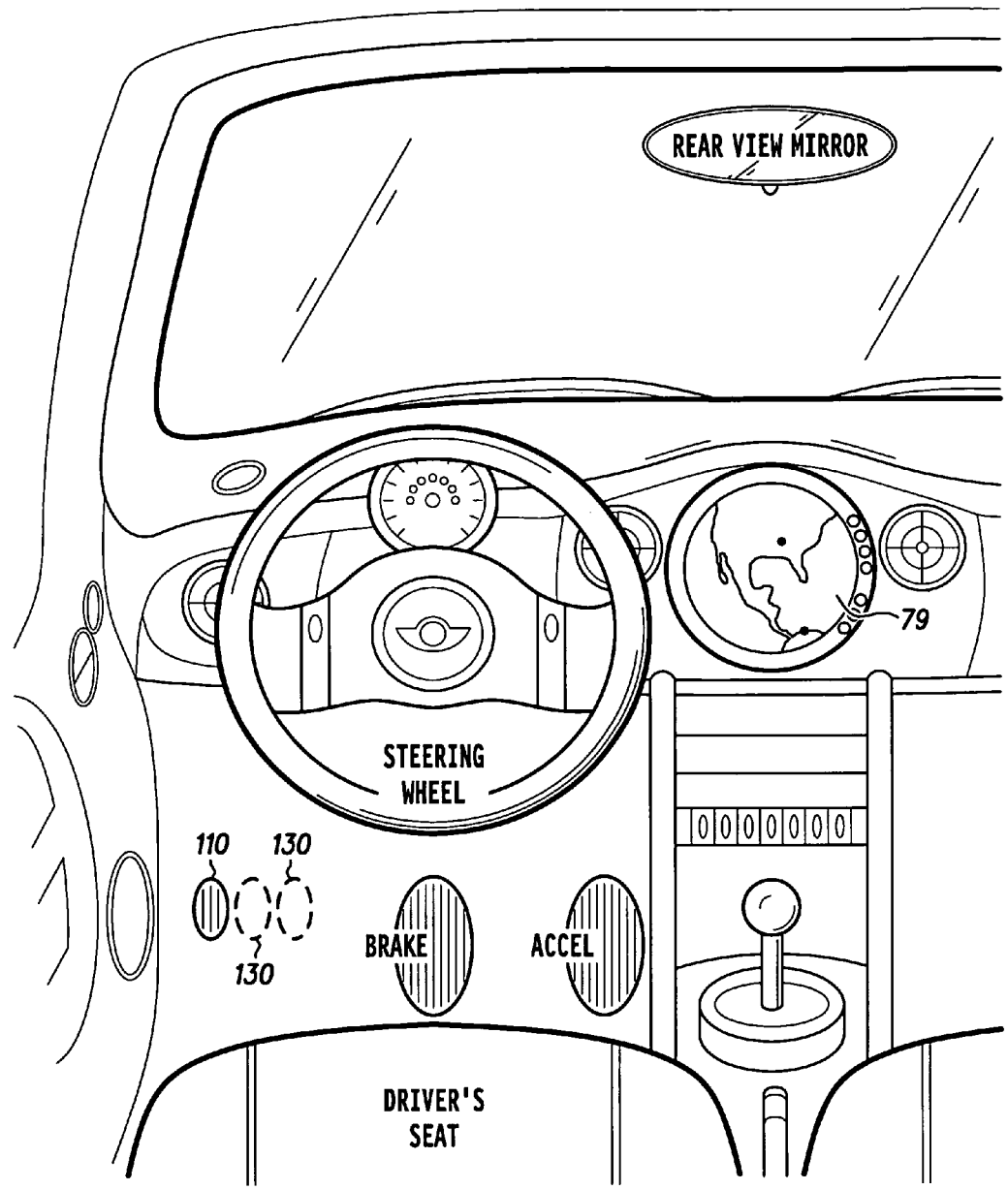
FIG. 3 is a diagram illustrating a perspective view of the inside of a vehicle, including the user interface, and including a programmable foot pedal for controlling the user interface.

FIG. 3 shows one embodiment of the inside interior of a vehicle 26 and its user interface 51, with user interface 51 modified to include a programmable foot pedal 110 built into the foot well of the driver's seat. As discussed above, FIG. 2 shows in inclusion of the foot pedal 110 in the control system for the user interface. The foot pedal 110 can be used to control many aspects of the user interface 51. The foot pedal 110 can be configured to perform a dedicated communication control function, and can provide such input to the controller 56 in the head unit 50. For example, depressing the foot pedal 110 can be used as the push-to-talk button, or can be used to answer or end a call, to mute or reduce the volume of voices broadcast through the speakers 78, etc. However, the foot pedal 110 is more preferably programmable by the user of the vehicle to provide the type of communicative input (or inputs) most desired by the user. In any event, provision of a foot pedal 110 allows the user to select various communications options without the use of his or her hands. This provides the user extra freedom in selecting vehicle communication options, and should be safer because it will allow the driver to stay focused on driving while reducing the amount of buttons on the user interface 51 he must otherwise press.

The foot pedal 110 can comprise a pedal or button affixed to the floor of the vehicle proximate to a user's foot. It is preferably placed on the left side of the foot well where it is accessible by the driver's (free) left foot. However, the pedal 110 can also be placed proximate to the driver's right foot, and therefore made selectable with the same foot the driver would use to press the accelerator and brake pedals.

Figure 4:
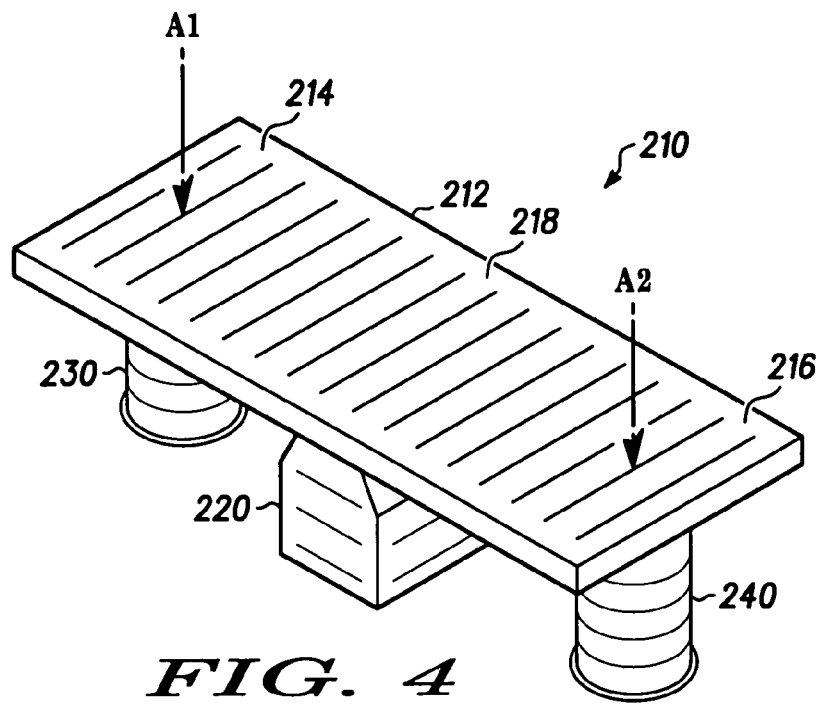
FIG. 4 illustrates a perspective view of another embodiment of a programmable foot pedal.

In one embodiment, as shown in FIG. 3, the foot pedal 110 is a single activated switch or button. In a further embodiment, as shown in FIG. 4, a foot pedal 210 allows an operator to program more than one feature or operation. Specifically, in this embodiment, the foot pedal 210 comprises of a main body portion 212, a rocker 220, a first switch 230, and a second switch 240. The main body portion 212 has a first end region 214, a second end region 216, and a center region 218. The center region 218 of the main body portion 212 is positioned adjacent to the rocker 220. This allows the first and second end regions 214, 216 to move up and down with relation to the center region 218. The first end region 214 is positioned adjacent to the first switch 230. The second end region 216 is positioned adjacent to the second switch 240. When the first end region 214 of the foot pedal 210 is pushed (in direction A1), a user will be able to activate the first switch 230. When the second end region 216 of the foot pedal 210 is pushed (in direction A2), a user activates the second switch 240.

Again, the foot pedal 210 can be used to control many aspects of the user interface 51. One of the switches 230, 240 of the foot pedal 210 can be configured to perform one dedicated communication control function and the other switch 230, 240 can perform another dedicated function. For example, depressing the bottom (or second end region 216) of the foot pedal 210 can be used as the push-to-talk button and depressing the top of the foot pedal (or first end region 214) can be used to increase the volume of voices broadcast through the speakers 78, etc. However, in either event, the foot pedal 210 is more preferably programmable by the user of the vehicle to provide the type of communicative input (or inputs) most desired by the user. This provision of a foot pedal 210 allows more flexibility to the user to select various communications options without the use of his or her hands.

Figure 5:
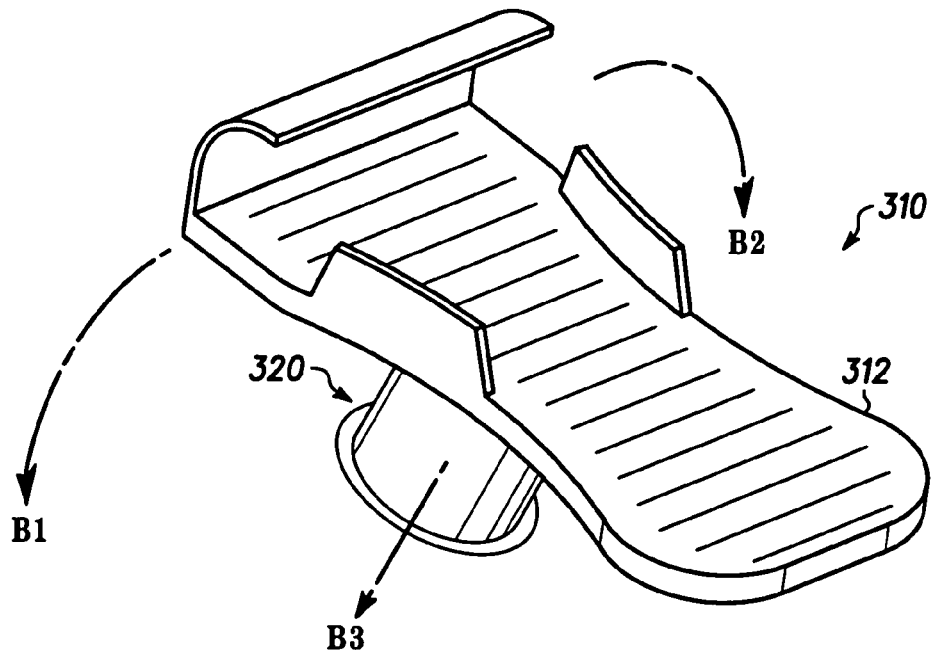
FIG. 5 illustrates a perspective view of a further embodiment of a programmable foot pedal.

In a further embodiment, as shown in FIG. 5, the foot pedal 310 comprises of a main body portion 312 and an actuator 320. Here, the main body portion 312 is configured to receive a foot of an operator of the vehicle. A center region of the main body portion 312 is attached to, and positioned adjacent to, the actuator 320. The actuator 320 in this embodiment is sensitive to an angular rotation force and a depression force. In particular, the main body portion 312 may be rotated by the operator in a first angular direction (B1) and a second angular direction (B2). Additionally, the main body portion 312 may be pushed down with a depression force by the operator in a downward direction (B3).

Like the previous embodiments, the foot pedal 310 can be used to control many aspects of the user interface 51. The system may be configured (or programmed by the operator) to perform a first control operation of the vehicle when the operator of the foot pedal 310 exerts a first angular force (in direction B1). The system may also configured (or programmed) to perform a second control operation of the vehicle when the operator of the foot pedal 310 exerts a second angular force (in direction B2). A third operation control operation of the vehicle may be accomplished when the user exerts a depression force (in direction B3). Alternatively, the system may be configured to perform the first control operation and the second control operation when the operator, in addition to exerting the first angular force or the second angular force, also exerts a depression force on the foot pedal 310.

Figure 6A:
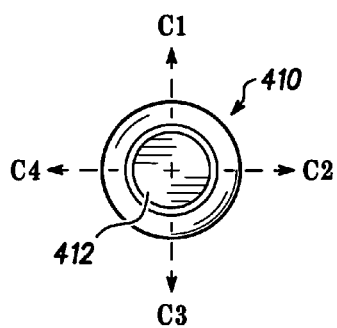
FIGS. 6a, 6b illustrate yet another embodiment of a programmable foot pedal.
Figure 6B:
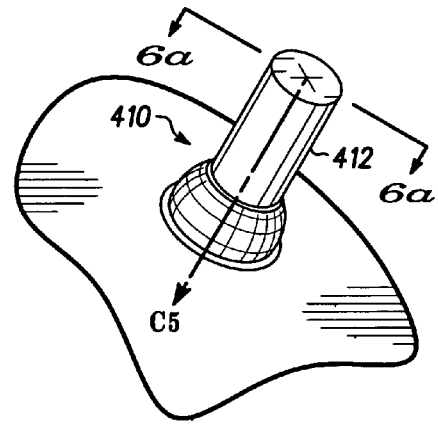

In yet another embodiment, as shown in FIG. 6, the foot pedal 410 has even further flexibility in the number of programmable options. Specifically, the foot pedal 410 comprises of a main body portion 412 that has several degrees of movement and positions. In this embodiment, an operator of the foot pedal 410 may move the main body portion 412 into a first position (in direction C1), a second position (in direction C2), a third position (in direction C3), a fourth position (in direction C4) and in a fifth position (in direction C5).

FIG. 6 shows the display 79 of the user interface 51 and how it can be used to program the functionality of the foot pedal 110 (or 210, 310, 410). FIG. 6 also shows a menu presented to the user which allows the user to program what function the foot pedal 110 will perform both before and during a call. Programming, i.e., association of the foot pedal 110 to various communication functions, can be accomplished by pressing buttons 114 associated with the display 79 and/or user interface 51 as shown. Thus, prior to a call, the buttons 114 may be used for example to associate the foot pedal 110 with: answering a call; providing mapping information; enabling a route tracking function, such as is disclosed in U.S. patent application Ser. No. 10/818,000, entitled "Methods for Displaying a Route Traveled by Mobile Users in a Communication Network," filed concurrently herewith; or posting a location-based message, such as is disclosed in U.S. patent application Ser. No. 10/818,078, entitled "Methods for Sending Messages Based on the Location of Mobile Users in a Communication Network," filed concurrently herewith. During the call, activation of the foot pedal 110 can: be used as the push-to-talk button; as a mute button to mute the conversation that is being broadcast through the user interface; or to select certain user IDs of user that are connected to the call so that appropriate action can be taken, which might be beneficial if communication modification techniques are employed such as are disclosed in U.S. patent application Ser. No. 10/818,079, entitled "Methods and Systems for Controlling Communications in an Ad Hoc Communication Network," filed concurrently herewith. The foot pedal 110 can be used both to control user communicative input to and output from the user interface 51. Of course, these communication functions are merely exemplary, and the foot pedal 110 could be programmed to perform other communication options or functions.

Ultimately, once programmed, the foot pedal settings can be stored in memory 64, and perhaps associated with the programming user's user ID, such as is disclosed in U.S. patent application Ser. No. 10/818,381, entitled "Method for Entering a Personalized Communication Profile Into a Communication User Interface," filed concurrently herewith. That way, when a user enters his user ID into the user interface to load is other default communication settings, the user's desired foot pedal settings will be loaded in as well. Moreover, loading in of foot petal settings can be accomplished using a wireless device such as a "key fob," again as is disclosed in that application, and which can be associated with a user ID to load in default communication setting for a particular user.

Although the foregoing discussion in relation to FIG. 3 included a single foot pedal being associated with a particular communication control function(s), multiple foot pedals can be used as well. Accordingly, shown are three foot pedals—110, and two foot pedals 130 in phantom—each of which can either be programmed to perform a dedicated communication control function or a programmable communication control function. For example, one pedal (110) could be used to answer or end a call, while one of pedals 130 could be used as the push-to-talk button, etc. Moreover, the foot pedals shown in the above embodiments may be hard wired into the controller 56 or may be a portable wireless device that rests on the floor of the vehicle and wireless communicates with the controller 56 via a short range transmission system.

Figure 7:
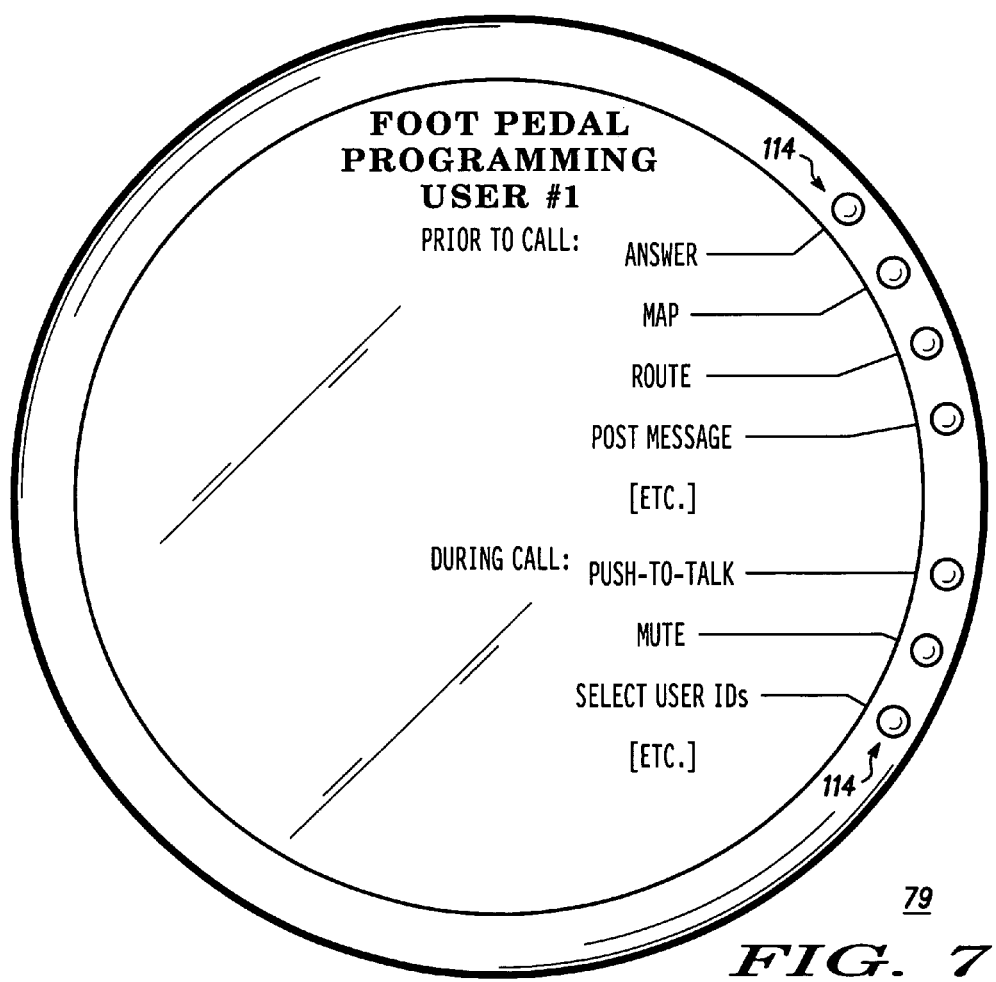
FIG. 7 is a diagram that illustrates a display in a user interface useful for programming a communication control function of the foot pedal.
Figure 8:
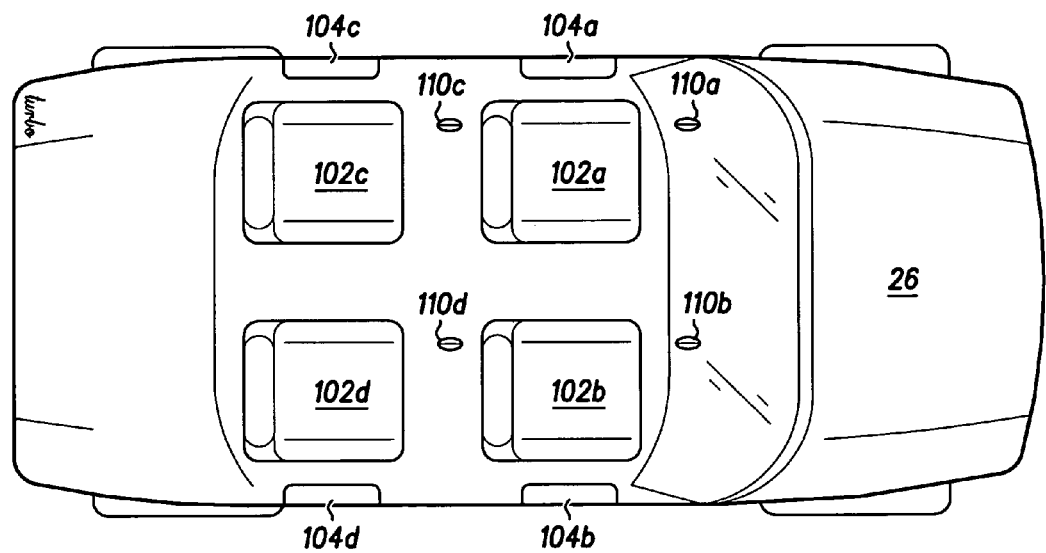
FIG. 8 is a diagram that illustrates a top view of a vehicle and shows a dedicated foot pedal for each seat location in the vehicle.

As is further disclosed in U.S. patent application Ser. No. 10/818,219, entitled "Methods for Controlling Processing of Inputs to a Vehicle Wireless Communication Interface," filed concurrently herewith and U.S. patent application Ser. No. 10/818,080, entitled "Methods for Controlling Processing of Outputs to a Vehicle Wireless Communication Interface," filed concurrently herewith, a vehicle can provide multiple occupants with the ability to configure or operate the communications user interface 51 by providing occupants access to the user interface 51 at their various seat locations. For example, as disclosed in these applications, each arm rest in the vehicle can be fitted with a push-to-talk button. Likewise, and as is illustrated in FIG. 7, each seat location 102a-d can contain a programmable or dedicated foot pedal 110a-d of the type disclosed herein, each of which can be can either perform a dedicated communication function or be programmable for each user at the locations 102a-d.

Although several discrete embodiments are disclosed, one skilled in the art with the benefit of this disclosure will appreciate that the embodiments can be combined with one another, and that the use of one is not necessarily exclusive of the use of other embodiments.

Although the disclosed foot pedal 110 (and 210, 310, 410) is believed primarily useful in controlling voice communications to and from the vehicle, one skilled in the art with the benefit of this disclosure will appreciate that the foot pedal may also be useful to controlling other types of communication, such as those that are text based. Thus, "communications" as used herein refers broadly to the transmission of data or information. Moreover, the foot pedal 110 can either control communications between the vehicle and the communication network (i.e., server 24) or merely within the vehicle itself.

"Pedal" as used herein refers to any device actuatable by a user's foot, such as a pedal, switch, button, or like actuators.

Although several discrete embodiments are disclosed, one skilled in the art will appreciate that the embodiments can be combined with one another, and that the use of one is not necessarily exclusive of the use of other embodiments. Moreover, the above description of the present invention is intended to be exemplary only and is not intended to limit the scope of any patent issuing from this application. The present invention is intended to be limited only by the scope and spirit of the following claims.

What is claimed is:

1. A user interface for a wireless communications system in a vehicle, the user interface comprising:
   an in-vehicle communications controller for controlling at least one wireless communication function within the vehicle; and
   at least one foot pedal for providing input to the controller to control the at least one wireless communication function within the vehicle, wherein the at least one foot pedal is programmable by a user of the vehicle.

2. The user interface of claim 1, wherein the foot pedal is programmable to perform different communication functions at different points in time.

3. The user interface of claim 1, wherein the foot pedal performs a wireless communication control function that is prescribed through entry of a user ID into the user interface.

4. The user interface of claim 3, wherein the user ID is entered into the user interface using a key fob.

5. The user interface of claim 1, wherein the user interface comprises a plurality of foot pedals associated with a single vehicle seat.

6. The user interface of claim 1, wherein the user interface comprises a plurality of foot pedals, wherein each foot pedal is associated with a unique seat in the vehicle.

7. The user interface of claim 1, wherein the foot pedal includes a main body portion, a rocker, a first switch and a second switch, the main body portion having a first end region, a second end region and a center region, wherein the center region of the main body portion is positioned adjacent to the rocker, the first end region of the main body portion is positioned adjacent to the first switch, and the second end region of the main body portion is positioned adjacent to the second switch.

8. The user interface of claim 1, wherein the foot pedal includes a main body portion and an actuator, the main body portion being attached to the actuator, the actuator being sensitive to an angular rotational force and a depression force.

9. The user interface of claim 8, wherein the main body portion of the pedal is configured to receive a foot of the user of the vehicle.

10. The user interface of claim 9, wherein the user of the vehicle may use the foot pedal to perform at least a first control operation and a second control operation, the first control operation being responsive to a first angular rotational force on the foot pedal and the second control operation being responsive to a second angular rotational force on the foot pedal.

11. The user interface of claim 10, wherein the first control operation and the second control operation are further responsive, in addition to the first angular rotational force and the second angular force, to a depression force applied by the operator on the foot pedal.

12. The user interface of claim 1, wherein the foot pedal includes a switch that has at least a first position, a second position, a third position and a fourth position.

13. A user interface for a vehicle, the user interface comprising:
   a controller for controlling a plurality of operations of the vehicle, wherein the controller is configured to communicate with a wireless communication network; and
   at least one user programmable foot pedal for providing input to the controller to control at least one of the plurality of operations of the vehicle.

14. The user interface of claim 13, wherein the foot pedal is programmable to perform at least one operation associated with communicating with the wireless communication network.

15. The user interface of claim 14, wherein the foot pedal is programmable to initiate a communication with the wireless communication network.

16. A user interface for a vehicle, the user interface comprising:
   a controller for controlling a plurality of operations of the vehicle; and
   at least one user programmable foot pedal for providing input to the controller to control at least one of the plurality of operations of the vehicle, wherein the programmable foot pedal performs a communication control operation that is prescribed through entry of a user ID into the user interface.

17. The user interface of claim 16, wherein the user ID is entered into the user interface using a key fob.

18. The user interface of claim 13, wherein the user interface comprises a plurality of programmable foot pedals associated with a single vehicle seat.

19. A user interface for a vehicle, the user interface comprising:
a controller for controlling a plurality of operations of the vehicle; and
at least one user programmable foot pedal for providing input to the controller to control at least one of the plurality of operations of the vehicle, wherein the user interface comprises a plurality of programmable foot pedals, wherein each programmable foot pedal is associated with a unique seat in the vehicle.

20. A user interface for a vehicle, the user interface comprising:
a controller for controlling a plurality of operations of the vehicle; and
at least one user programmable foot pedal for providing input to the controller to control at least one of the plurality of operations of the vehicle, wherein the programmable foot pedal includes a main body portion, a rocker, a first switch and a second switch, the main body portion having a first end region, a second end region and a center region, wherein the center region of the main body portion is positioned adjacent to the rocker, the first end region of the main body portion is positioned adjacent to the first switch, and the second end region of the main body portion is positioned adjacent to the second switch.

21. The user interface of claim 13, wherein the programmable foot pedal includes a main body portion and an actuator, the main body portion being attached to the actuator, the actuator being sensitive to an angular rotational force and a depression force.

22. The user interface of claim 21, wherein the main body portion of the programmable foot pedal is configured to receive a foot of an operator of the vehicle.

23. A The user interface for a vehicle, the user interface comprising:
a controller for controlling a plurality of operations of the vehicle; and
at least one user programmable foot pedal for providing input to the controller to control at least one of the plurality of operations of the vehicle,
wherein the programmable foot pedal includes a main body portion and an actuator, the main body portion being attached to the actuator, the actuator being sensitive to an angular rotational force and a depression force, and wherein the operator of the vehicle may use the foot pedal to perform at least a first control operation and a second control operation, the first control operation being responsive to a first angular rotational force on the foot pedal and the second control operation being responsive to a second angular rotational force on the foot pedal.

24. The user interface of claim 23, wherein the first control operation and the second control operation are further responsive, in addition to the first angular rotational force and the second angular force, to a depression force applied by the operator on the foot pedal.

25. The user interface of claim 13, wherein the programmable foot pedal includes a switch that has at least a first position, a second position, a third position and a fourth position.

26. A communication system in a vehicle comprising:
a user programmable foot switch;
a controller that is capable of receiving an input from the user programmable foot switch; and
a wireless network device that is capable of establishing a wireless communication link in response to the input received by the controller from the user programmable foot switch.

27. The communication system of claim 26, wherein the communication system further comprises a head unit, a Telematics control unit, and a vehicle bus that communication information between the head unit and the Telematics control unit, the controller being a component in the head unit and the wireless network device being a component of the wireless network device.

28. The communication system of claim 26, wherein the communication system further comprises a memory for storing information associated with the operation of the programmable foot switch, the information including at least information for establishing a wireless communication link.

29. The communication system of claim 26, wherein the communication system further comprises a user interface that allows a user in the vehicle to program an operation of the programmable foot switch.

30. A communication system in a vehicle for establishing a wireless communication channel, the communication system comprising:
a controller;
a user interface connected to the controller, the user interface having a foot switch, a microphone, a speaker, and a means for allowing a user in the vehicle to select from a plurality of wireless communication channels; and
a Telematics control unit in wireless communication with a remote server;
wherein the controller is configured to only allow audio from the microphone to be transmitted through the Telematics control unit to the remote server when the user presses the foot switch and is configured to only allow audio received from the remote server to be heard by the user when the user is not pressing the foot switch.

31. The communication system of claim 30, wherein the communication system further comprises a memory for storing information associated with the operation of the foot switch, the information including at least information for establishing the wireless communication channel.

32. The communication system of claim 30, wherein the user interface further includes a means to allow a user in the vehicle to program an operation of the foot switch.

* * * * *

UNITED STATES PATENT AND TRADEMARK OFFICE
CERTIFICATE OF CORRECTION

PATENT NO.        : 7,245,898 B2                                                  Page 1 of 1
APPLICATION NO. : 10/818076
DATED             : July 17, 2007
INVENTOR(S)       : Van Bosch et al.

It is certified that error appears in the above-identified patent and that said Letters Patent is hereby corrected as shown below:

Please change the fifth inventor's name from Nick "B". Grivas to Nick --J--. Grivas In Specification, column 1, line 30, change Serial Number "10/818,219" to

--10/818,299--

Signed and Sealed this

Fifth Day of August, 2008

JON W. DUDAS
*Director of the United States Patent and Trademark Office*